(12) United States Patent
Destieu et al.

(10) Patent No.: US 9,388,974 B2
(45) Date of Patent: Jul. 12, 2016

(54) TEXTILE COVERING INCORPORATING AN OPTICAL FIBRE AND ASSOCIATED INSTALLATION METHOD

(71) Applicant: Airbus Corporate Jet Centre, Toulouse (FR)

(72) Inventors: Jean-Cyrille Destieu, Merville (FR); Dorine Servant, Castelmaurou (FR); Cyrille Nicolas, Saint Sauveur (FR); Isabelle Jamme, Toulouse (FR)

(73) Assignee: AIRBUS CORPORATE JET CENTRE, Toulouse (FR)

( * ) Notice: Subject to any disclaimer, the term of this patent is extended or adjusted under 35 U.S.C. 154(b) by 347 days.

(21) Appl. No.: 13/857,849

(22) Filed: Apr. 5, 2013

(65) Prior Publication Data

US 2013/0265797 A1 Oct. 10, 2013

(30) Foreign Application Priority Data

Apr. 6, 2012 (FR) .................................. 12 53229

(51) Int. Cl.
| | |
|---|---|
| *G02B 6/44* | (2006.01) |
| *F21V 33/00* | (2006.01) |
| *B23P 19/00* | (2006.01) |
| *D06C 27/00* | (2006.01) |
| *B60Q 3/02* | (2006.01) |
| *F21V 8/00* | (2006.01) |
| *B60Q 3/00* | (2006.01) |

(52) U.S. Cl.
CPC ............. *F21V 33/0028* (2013.01); *B23P 19/00* (2013.01); *B60Q 3/004* (2013.01); *B60Q 3/0256* (2013.01); *B60Q 3/0283* (2013.01); *D06C 27/00* (2013.01); *G02B 6/0008* (2013.01); *B60Q 2500/10* (2013.01); *Y10T 29/49865* (2015.01)

(58) Field of Classification Search
None
See application file for complete search history.

(56) References Cited

U.S. PATENT DOCUMENTS

| | | | |
|---|---|---|---|
| 4,814,948 A | 3/1989 | Hasegawa | |
| 4,884,865 A * | 12/1989 | Grise | G02B 6/0006 |
| | | | 362/554 |
| 5,129,032 A | 7/1992 | Kawai et al. | |
| 5,532,711 A | 7/1996 | Harris | |
| 5,740,296 A * | 4/1998 | Harris | 385/116 |
| 6,322,751 B1 | 11/2001 | Burge | |
| 2011/0176326 A1* | 7/2011 | Stephan | G02B 6/0008 |
| | | | 362/555 |

FOREIGN PATENT DOCUMENTS

| | | |
|---|---|---|
| DE | 20022086 | 4/2001 |
| EP | GB 8911805 A1 * 12/1989 | ............... A62B 3/00 |

(Continued)

OTHER PUBLICATIONS

French Search Report, Oct. 16, 2012.

*Primary Examiner* — Ryan Lepisto
*Assistant Examiner* — Erin Chiem
(74) *Attorney, Agent, or Firm* — Greer, Burns & Crain, Ltd.

(57) ABSTRACT

A textile covering, comprising an under-layer in contact with a rear face of a layer of textile fibers, and comprising an optical fiber housed inside a routing groove in the under-layer, an end portion of the optical fiber extending through the layer of textile fibers via a support device of the optical fiber. The support device comprises a fixing ring and a heat-shrink tubing covering part of the fixing ring and of the end portion. The fixing ring comprises a base in contact with the rear face and a cylindrical portion into which the end portion of the optical fiber is inserted. The textile covering may be used as carpet equipping the floor of an aircraft cabin.

6 Claims, 3 Drawing Sheets

(56) References Cited

FOREIGN PATENT DOCUMENTS

| | | | |
|---|---|---|---|
| EP | 0459153 | 12/1991 | |
| EP | GB 2470888 A * | 12/2010 | ............. D03D 15/00 |
| GB | 2451709 | 2/2009 | |
| JP | 2002048958 | 2/2002 | |
| WO | WO 8911805 A * | 12/1989 | |
| WO | 9810316 | 3/1998 | |

* cited by examiner

TEXTILE COVERING INCORPORATING AN OPTICAL FIBRE AND ASSOCIATED INSTALLATION METHOD

CROSS-REFERENCES TO RELATED APPLICATIONS

This application claims the benefit of the French patent application No. 1253229 filed on Apr. 6, 2012, the entire disclosures of which are incorporated herein by way of reference.

BACKGROUND OF THE INVENTION

The present invention relates to a textile covering incorporating an optical fibre.

It also relates to a method for installing optical fibres in a textile covering.

The present invention generally relates to the field of the installation of optical fibres in a carpet-type textile covering, making it possible to obtain a lighting pattern on the floor.

In particular it is used, non-limitatively, for the interior furnishing of an aircraft cabin.

In this type of use, provision can be made for producing a covering with a pattern of light for aesthetic reasons but also for safety reasons, by providing for example a light guiding system on the floor.

Thus, from the document U.S. Pat. No. 4,754,372 a textile covering is known, incorporating a bundle of optical fibres connected to a light source at one end of the bundle.

The optical fibres in the bundle are arranged or oriented individually along a rear face of the textile covering, the end of each optical fibre entering the thickness of the textile covering in order to emerge in the plane of the textile fibres and thus create a multitude of light spots on the visible face of the textile covering.

It is however difficult to hold the ends of the optical fibres in an upright position in the middle of the textile fibres, and for example in a vertical position when the textile covering is laid on the floor, even when the covering has relatively dense tufts of textile fibres.

SUMMARY OF THE INVENTION

The purpose of the present invention is to propose a textile covering incorporating an optical fibre and a method for installing optical fibres in a textile covering improving the holding in position of the ends of the optical fibres in the textile covering.

To this end, the present invention relates to a textile covering comprising an under-layer in contact with a rear face of a layer of textile fibres.

According to the invention, the textile covering comprises an optical fibre housed inside a routing groove in the under-layer, one end portion of the optical fibre extending through the layer of textile fibres by means of a support device of the optical fibre, the support device comprising a fixing ring and a heat-shrink tubing covering part of the fixing ring and of the end portion, the fixing ring comprising a base in contact with the rear face and a cylindrical portion into which the end portion of the optical fibre is inserted.

The support device thus makes it possible to protect the end portion of the optical fibre while holding it upright in the textile covering.

Such a support device makes it possible to hold the end of the optical fibre in a favorable direction inside a textile covering, and in particular perpendicular to the floor when the textile covering is a floor carpet, equipping for example the floor of an aircraft cabin.

The end of the optical fibre is moreover protected from wear, in particular when the textile covering is intended to be laid on the floor.

In a practical embodiment, the cylindrical portion has an internal diameter substantially equal to the external diameter of the optical fibre and the base comprises a cut-out through which the optical fibre passes.

The cut-out through which the optical fibre passes, in the base of the fixing ring facilitates the curving of the optical fibre on leaving the cylindrical portion of the fixing ring.

According to a second aspect, the present invention relates to a method for installing an optical fibre in a textile covering.

This installation method comprises the following steps:
  inserting an end portion of the optical fibre into a fixing ring;
  crimping the fixing ring around the end portion of the optical fibre;
  inserting the fixing ring and the end portion of the optical fibre into a heat-shrink tubing;
  shrinking of the heat-shrink tubing covering part of the fixing ring and the end portion of the optical fibre; and
  inserting the end portion of the optical fibre covered with the heat-shrink tubing into a layer of textile fibres of the textile covering.

This method thus makes it possible to reliably install optical fibres in a textile covering.

In particular, the use of a heat-shrink tubing extending from the fixing ring makes it possible to facilitate the insertion of the end portion of the optical fibre through the layer of textile fibres and then hold this end upright in the layer of textile fibres of the textile covering by means of the base of the fixing ring.

In an embodiment of the invention, the installation method also comprises a step of cutting off a terminal part of the end portion of the optical fibre level with the textile fibres of the layer of textile fibres of the textile covering.

The installation method makes it possible to produce a pattern of light in the plane of the layer of textile fibres of the covering.

Moreover, the end portion of the optical fibre does not extend beyond the layer of textile fibres of the textile covering, thus improving the protection of the end of the optical fibre against wear.

According to a practical implementation of the invention, the installation method also comprises the following steps:
  producing an opening through a rear face of the layer of textile fibres, the rear face being opposite a visible face of the textile covering;
  inserting the heat-shrink tubing and the fixing ring through the throughhole, the fixing ring comprising a base; and
  holding the end portion of the optical fibre inserted into the layer of textile fibres, the base of the fixing ring being in contact with the rear face.

The end portion of the optical fibre is thus reliably held in position inside the layer of textile fibres thanks to the base of the fixing ring abutting the rear face of the textile covering.

In an embodiment in which the textile covering comprises an under-layer intended to be in contact with a rear face of the textile layer of the textile covering, the method also comprises the following steps:
  cutting at least one routing groove for an optical fibre in the under-layer; and
  cutting an opening in the under-layer at one end of said at least one routing groove, the opening being positioned opposite a throughhole produced in the layer of textile fibres and suitable for the end portion of the optical fibre to pass through.

When an under-layer, also called backing, is used in the textile covering, the production of a routing groove makes it possible to improve the life span of the optical fibre by limiting its wear when it is routed under the textile covering.

Moreover, housing the optical fibre inside a routing groove in the under-layer makes it possible to avoid creating an excess thickness on the rear face of the layer of textile fibres of the textile covering, such excess tending to make the routing of the optical fibres at the back of the textile covering visible on a visible face of the textile covering.

Other features and advantages of the invention will also become apparent from the description below.

BRIEF DESCRIPTION OF THE DRAWINGS

In the attached drawings, given by way of non-limitative examples.

DETAILED DESCRIPTION OF THE PREFERRED EMBODIMENTS

Figure 1:
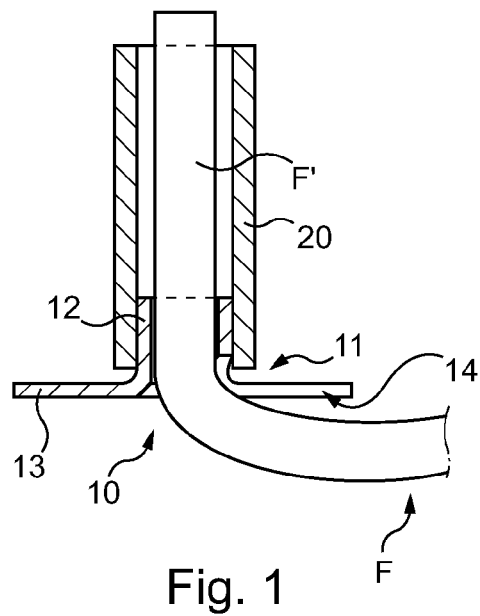
FIG. 1 is a longitudinal cross-sectional view of a support device of an optical fibre before shrinking of the heat-shrink tubing.

First, with reference to FIGS. 1 and 2 a support device of an optical fibre intended to hold an end portion of an optical fibre in a textile covering, and in particular in a carpet intended to cover a wall, will be described.

In the remainder of the description, it will be assumed non-limitatively that the support device of an optical fibre is intended to hold vertical an end of optical fibre in a carpet laid on the floor.

The support device 10 comprises a fixing ring 11 intended to be fixed on an optical fibre F.

In this embodiment, the fixing ring 11 comprises a cylindrical portion 12 the internal diameter of which is substantially equal to the external diameter of the optical fibre F.

Thus, the optical fibre F can be inserted inside the cylindrical portion 12 of the fixing ring 11.

The fixing ring 11 also comprises a base 13. This base 13 thus forms a collar at one end of the cylindrical portion 12 of the fixing ring 11.

A cut-out 14 is provided at the level of the base 13 to allow the optical fibre F emerging from the cylindrical portion 12 of the fixing ring 11 to pass through.

Figure 3:
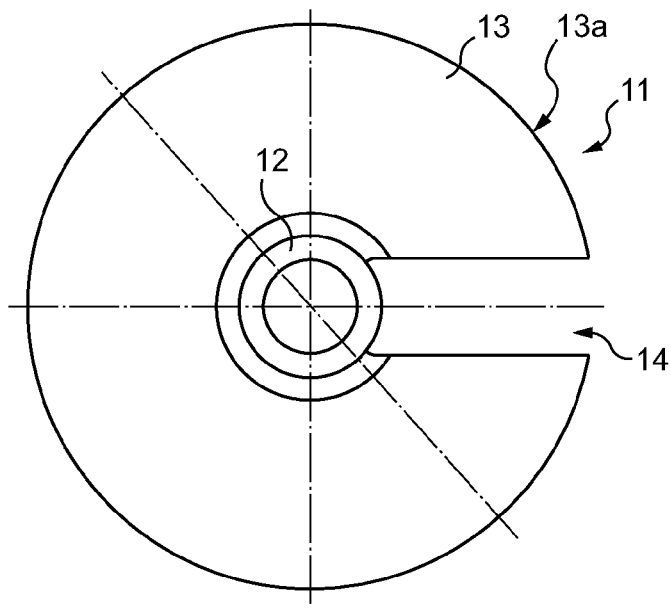
FIG. 3 is a top view of a fixing ring of the support device illustrated in FIG. 1.
Figure 4:
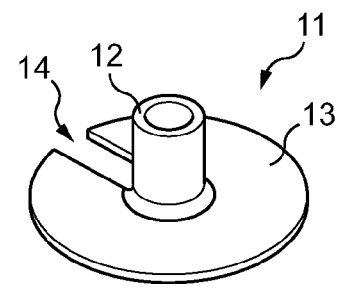
FIG. 4 is a perspective view of the fixing ring of FIG. 3.

As illustrated in FIGS. 3 and 4, the base 13 is formed by an annular portion around one end of the cylindrical portion 12 of the fixing ring 11.

The cut-out 14 extends substantially in the direction of a radius of the annular portion of the base 13.

The cut-out 14 thus constitutes a slot for the optical fibre F to pass through.

Moreover, the cut-out 14 preferably extends between an edge 13a of the base 13 and one end of the cylindrical portion 12 of the fixing ring 11.

In this embodiment, and non-limitatively, the cut-out 14 has a substantially rectangular shape, with a longitudinal central axis corresponding to a radius of the base 13 and the cylindrical portion 12 of the fixing ring 11.

Of course, this cut-out 14 could have a different shape, and for example be constituted by an angular sector of the annular portion constituting the base 13.

Non-limitatively, and purely by way of illustration, the internal diameter of the cylindrical portion 12 can be comprised between 1 and 4 mm, and for example equal to 2 mm.

The external diameter of the cylindrical portion 12 can be comprised between 2 and 5 mm, and for example equal to 3 mm.

The external diameter of the base 13 can by way of non-limitative example be comprised between 10 and 15 mm, and for example equal to 12 mm.

The fixing ring 11 thus described makes it possible to house an optical fibre F of external diameter substantially equal to 2 mm.

The support device 10 also comprises a heat-shrink tubing 20.

This heat-shrink tubing 20, before shrinking, is presented in the form of a cylindrical sleeve of appropriate length for covering at least part of the fixing ring 11 and an end portion F' of the optical fibre F.

In this embodiment, the heat-shrink tubing 20 is suitable for housing the cylindrical portion 12 of the fixing ring 11.

Thus, before shrinking, the internal diameter of the heat-shrink tubing 20 is substantially greater than or equal to the external diameter of the cylindrical portion 12 of the fixing ring 11.

Figure 2:
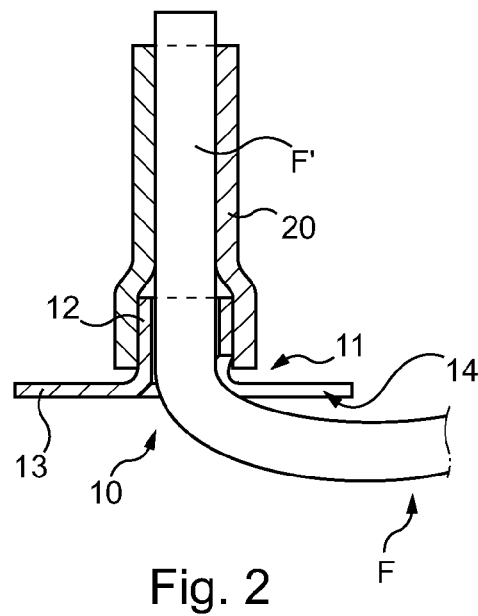
FIG. 2 is a view similar to FIG. 1, after shrinking of the heat-shrink tubing.

As illustrated in FIG. 2, the heat-shrink tubing is suitable for shrinking, under the effect of heat, so as to cover part of the fixing ring 11, and here the cylindrical portion 12, and an end portion F' of the optical fibre F which extends through the fixing ring 11 and the heat-shrink tubing 20.

A method for installing an optical fibre F in a textile covering will now be described with reference to FIG. 5 and subsequent figures.

In the embodiment example given below, the textile covering comprises, non-limitatively, an under-layer, also called backing.

Figure 6:
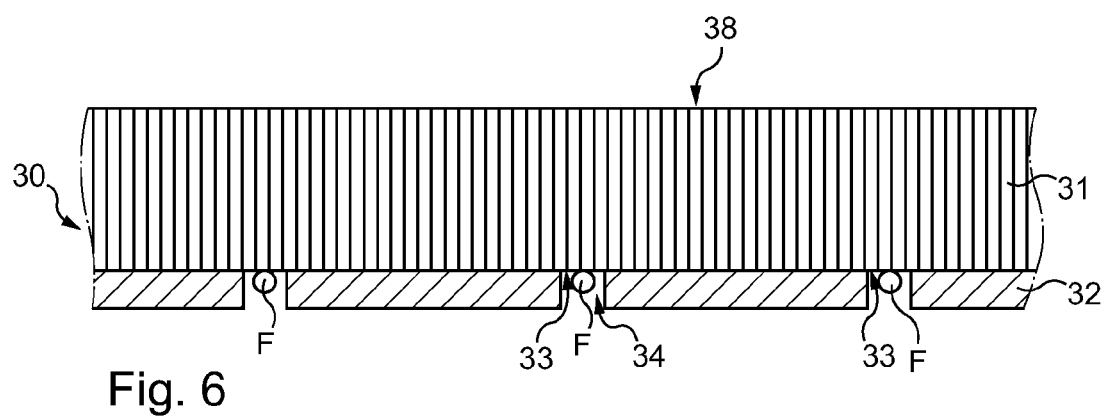
FIG. 6 is a truncated cross-sectional view in a plane perpendicular to the surface of the textile covering, illustrating the routing of optical fibres.

With reference to FIG. 6, the textile covering 30 in this embodiment thus comprises a layer of textile fibres 31 intended to constitute the visible face of the textile covering 30 and an under-layer 32 intended to be in contact with a rear face 33 of the layer of textile fibres 31.

By way of non-limitative example, the under-layer 32 can have a thickness substantially equal to 4 mm. The layer of textile fibres 31 can, by way of non-limitative example, have a thickness comprised between 8 mm and 14 mm.

Figure 5:
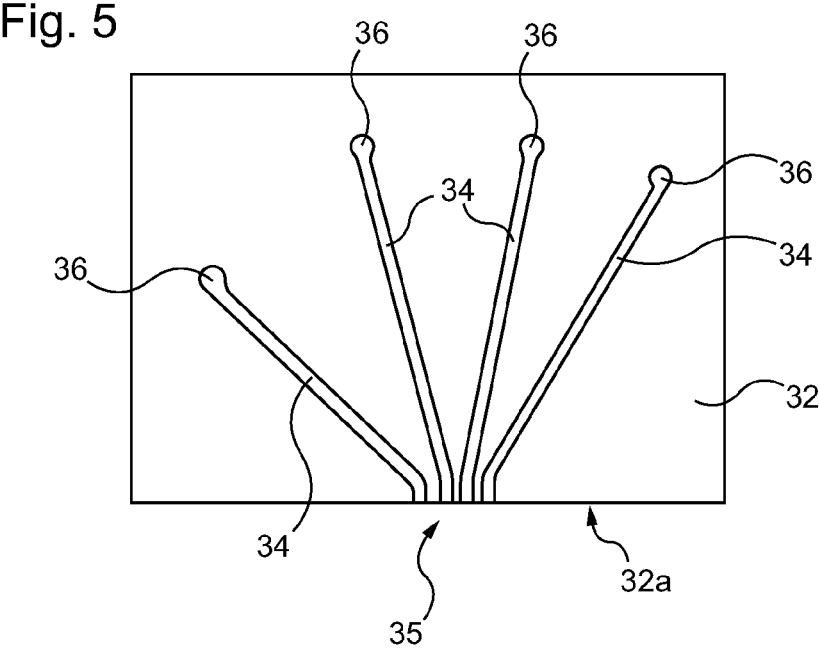
FIG. 5 is a diagrammatic view illustrating a step of cutting routing grooves and openings in a textile covering under-layer.

The installation method first comprises, with reference to FIG. 5, a step of cutting one or more routing grooves 34 for an optical fibre F, in the under-layer 32.

Purely by way of illustration, FIG. 5 shows four routing grooves 34 cut in an under-layer 32 of a textile covering 30.

The path of each routing groove 34 is determined as a function of the subsequent positioning of each optical fibre F.

In particular, the optical fibres F are presented in the form of a bundle one of the ends of which is intended to be connected to a light source (not shown).

The routing grooves 34 thus extend from a common area 35, opening onto an edge 32a of the under-layer 32.

At the level of this common area 35, the optical fibres F are intended to be held in a bundle, for example by means of a heat-shrink sleeve, and are connected to a light source.

Moreover, each routing groove 34 extends from this common area 35 to an end the position of which is determined as a function of the desired position of each end of optical fibres F, as a function of the desired pattern of light on the textile covering 30.

In a practical embodiment, the routing grooves 34 can be produced using a utility knife.

These routing grooves 34 must be suitable for housing the optical fibres F in their length, and have for example a width of approximately 4 mm, sufficient to house optical fibres F having an external diameter of approximately 2 mm.

At the end of each routing groove 34, an opening 36 is cut in the under-layer 32.

This opening is thus positioned opposite a throughhole 37 (see FIG. 7) produced in the layer of textile fibres 31 and suitable for the optical fibre F to pass through.

The openings 36 can be cut in the under-layer 32, by way of non-limitative example using a hollow punch.

The diameter of the openings 36 can be comprised between 12 and 20 mm, and for example substantially equal to 14 mm.

As will become clearly apparent from the remainder of the description, the diameter of this opening 36 must substantially correspond to the diameter of the base 13 of the fixing ring 11, or in any case be sufficient to house the base 13 of the fixing ring.

Once these cutting steps have been carried out, the under-layer 32 can be bonded, using standard techniques, to the rear face 33 of the layer of textile fibres 31 of the textile covering 30.

A neoprene adhesive or equivalent can be used to carry out this bonding.

A bundle of optical fibres F is then put into place at the level of the under-layer 32.

Thus, as illustrated in FIG. 6, each optical fibre F is placed in a routing groove 34 in the under-layer 32.

Preferably, a layer of silicone is previously applied to each routing groove 34 in the under-layer 32, before installing each optical fibre F.

As indicated previously, the connection ends of the bundle of optical fibres F are brought together at the level of the common area 35 in order to be connected to a light source.

In practice, at the level of the common area 35, the under-layer 32 is cut out to allow each optical fibre F emerging from the routing grooves 34 which open into the common area 35, to pass through on the flat.

The optical fibres F are for example brought together and held in a bundle by means of a heat-shrink tubing (not shown) then facilitating connection of the bundle of optical fibres F to a light source.

At each end of the routing grooves 34 and at the corresponding openings 36, the end portion F' of each optical fibre F is mounted in a support device 10 as described previously in relation to FIGS. 1 and 2.

In practice, the end portion F' of the optical fibre F is first inserted into the fixing ring 11.

During this insertion step, it is necessary to allow an end portion F' to extend sufficiently beyond the fixing ring 11.

A step of crimping the fixing ring 11 is then implemented in order to fix the fixing ring 11 on the length of the optical fibre F, at the end portion F' of the optical fibre F.

The end portion F' of the optical fibre F thus fixed to the fixing ring 11 is then inserted into the heat-shrink tubing 20.

The shrinking of the heat-shrink tubing 20 is then achieved by the use of a standard heating device.

The heat-shrink tubing 20 thus shrinks to fit the external diameter of the cylindrical portion 12 of the fixing ring 11 and the external diameter of the end portion F' of the optical fibre F.

In order to improve the fixing of the support device 10 onto the end portion F' of the optical fibre F, the installation method also comprises a step of bonding the heat-shrink tubing 20 onto the cylindrical portion 12 of the fixing ring 11 and the end portion F' of the optical fibre F.

In practice, the heat-shrink tubing 20 is withdrawn after shrinking, followed by gluing, for example using a cyanoacrylate-type adhesive, the cylindrical portion 12 of the fixing ring 11 and the end portion F' of the optical fibre F.

The heat-shrink tubing 20 is then remounted on the fixing ring 11 and the end portion F' of the optical fibre F in order to carry out the bonding of the assembly.

This step of bonding the heat-shrink tubing 20 can optionally be omitted if the shrinking of the heat-shrink tubing 20 is sufficient to allow this heat-shrink tubing 20 to be held on the fixing ring 11 and the end portion F' of the optical fibre.

Figure 7:
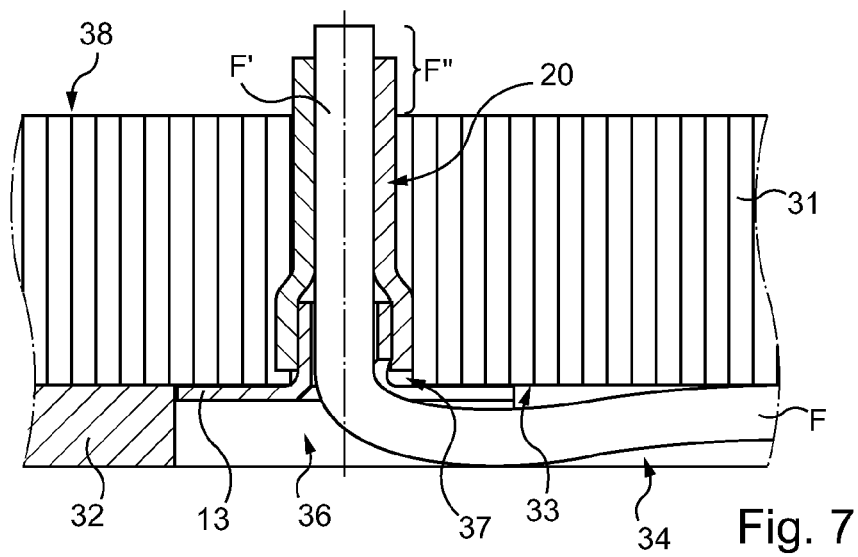
FIG. 7 is a truncated cross-sectional view in a plane perpendicular to the surface of the textile covering, illustrating the insertion of an end portion of optical fibre into the textile covering.

The support device 10 provided with the end portion F' of the optical fibre F is thus, as illustrated in FIG. 7, inserted into the layer of textile fibres 31 of the textile covering 30.

In practice, a throughhole 37 is produced opposite the openings 36 initially provided in the under-layer 32.

This throughhole 37 is produced in the rear face 33 of the layer of textile fibres 31, i.e. in the rear face 33 opposite the visible face 38 of the textile covering.

This throughhole 37 must have a large enough diameter to allow the heat-shrink tubing 20 covering the end portion F' of the optical fibre F and part of the fixing ring 11 to be inserted through this throughhole 37.

This installation method then comprises a step of inserting the heat-shrink tubing 20 and the fixing ring 11 through the throughhole 37.

Thanks to the rigidity provided by the heat-shrink tubing 20 on the end portion F' of the optical fibre F, it is possible for the through hole 37 in the layer of textile covering 31 to be produced only partially in the thickness of the layer of textile covering 31, as it is possible to insert the end of the optical fibre F by force through the layer of textile fibres 31 at the level of the through hole 37.

The installation method then comprises a step of holding the end portion F' of the optical fibre F inserted into the layer of textile fibres 31, the base 13 of the fixing ring 11 being held in contact with the rear face 33 of the layer of textile fibres 31.

The end portion F' of the optical fibre F is thus inserted until the base 13 abuts the rear face 33 of the layer of textile fibres 31, ensuring a reliable position of the support device 10 of the optical fibre F.

After positioning the support devices 10 equipping each optical fibre F of the bundle and positioning the optical fibres F in each routing groove 34, the installation method comprises a step of filling the routing grooves 34 and openings 36 cut in the under-layer 32 with a latex-type rubbery material.

Figure 8:
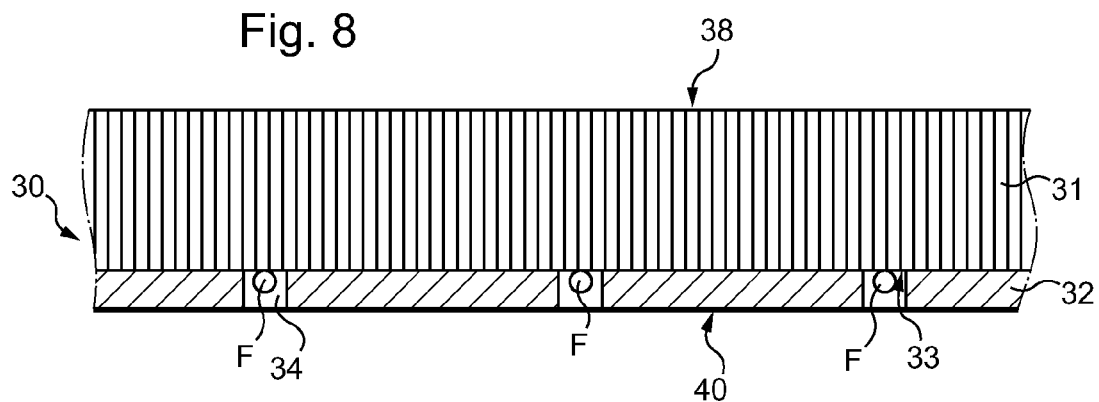
FIG. 8 is a view similar to FIG. 6 illustrating a step of filling a routing groove.
Figure 9:
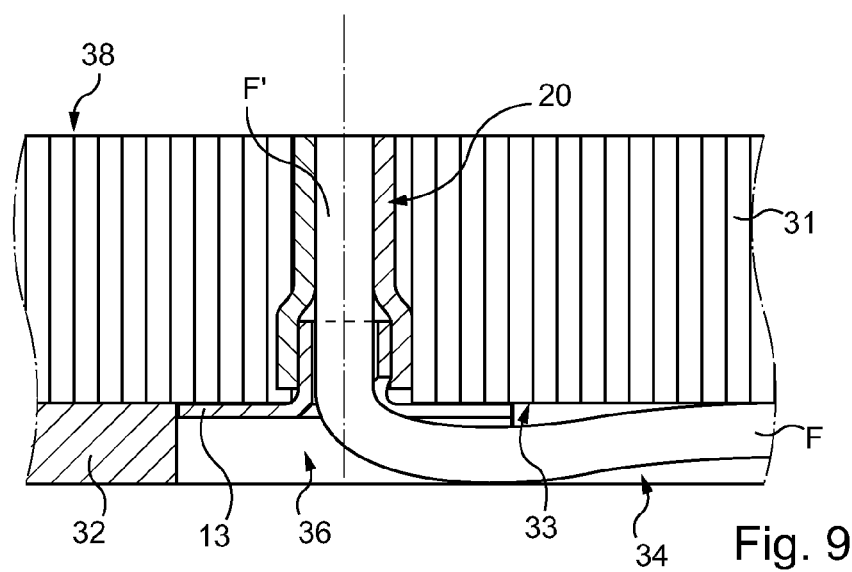
FIG. 9 is a view similar to FIG. 7 illustrating a step of cutting off an end of an optical fibre.

As illustrated in FIG. 8, a finishing fabric 40 is glued onto the under-layer 32 in order to conceal the routing grooves 34 and the openings 36 filled with a rubbery material.

Finally, the installation method comprises a step of cutting off a terminal part F'' of the end portion F' of the optical fibre F so that the optical fibre F does not project beyond the textile fibres of the layer of textile fibres 31 of the textile covering 30.

Thus, the optical fibre F has an end which extends substantially in the plane of the visible face 38 of the textile covering 30.

Thus, the end portion F' of the optical fibre F is protected by the textile fibres of the textile covering and held in a preferential direction, and in the previously described embodiment, in a vertical direction, through the layer of textile fibres 31 of the textile covering 30.

The end of the optical fibre F creates a light spot in the plane of the visible face 38 of the textile covering 30.

This installation method is particularly suitable for installing a network of optical fibres in a carpet equipping the floor of an aircraft cabin in order to produce a series of light spots arranged in a predetermined pattern.

This installation method utilizes a mechanical interface making it possible to hold vertically optical glass fibres embedded in a carpet.

The heat-shrink tubing assembly moreover makes it possible to eliminate the "palm-tree" effect due to wear of the optical glass fibre.

The support device moreover allows easy installation and reliable positioning of the ends of optical fibres in a textile covering.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A textile covering comprising an under-layer in contact with a rear face of a layer of textile fibres, wherein the textile covering comprises an optical fibre housed inside a routing groove in said under-layer, an end portion of the optical fibre extending through the layer of textile fibres by means of a support device of the optical fibre, the support device comprising a fixing ring including a base and a truncated cylindrical tube extending upwardly from the base and a heat-shrink tubing covering the truncated cylindrical tube and part of the end portion of the optical fibre extending beyond the truncated cylindrical tube wherein the heat-shrink tubing shrinks under the effect of heat, wherein the base is in contact with said rear face and the end portion of the optical fibre passes through the truncated cylindrical tube.

2. The textile covering according to claim 1, wherein the cylindrical portion has an internal diameter substantially equal to the external diameter of the optical fibre and the base comprises a cut-out for said optical fibre to pass through.

3. The textile covering according to claim 2, wherein said base is formed by an annular portion around one end of the cylindrical portion of the fixing ring, the pass-through cut-out extending substantially in the direction of a radius of the annular portion.

4. The textile covering according to claim 1 holding one end of an optical fibre vertical in a layer of textile fibres.

5. The textile covering according to claim 4 forming a carpet equipping a floor of an aircraft cabin.

6. A textile covering comprising an under-layer in contact with a rear face of a layer of textile fibres, wherein the textile covering comprises an optical fibre housed inside a routing groove in said under-layer, an end portion of the optical fibre extending through the layer of textile fibres by means of a support device of the optical fibre, the support device comprising a fixing ring and a heat-shrink tubing covering part of said fixing ring and part of the end portion of the optical fibre wherein the heat-shrink tubing shrinks under the effect of heat, the fixing ring comprising a base in contact with said rear face and a cylindrical portion into which the end portion of the optical fibre is inserted, wherein the base of the fixing ring comprises a cut-out extending from an edge of the base towards a center of the base forming a slot though which the optical fibre passes.

* * * * *